UNITED STATES PATENT OFFICE.

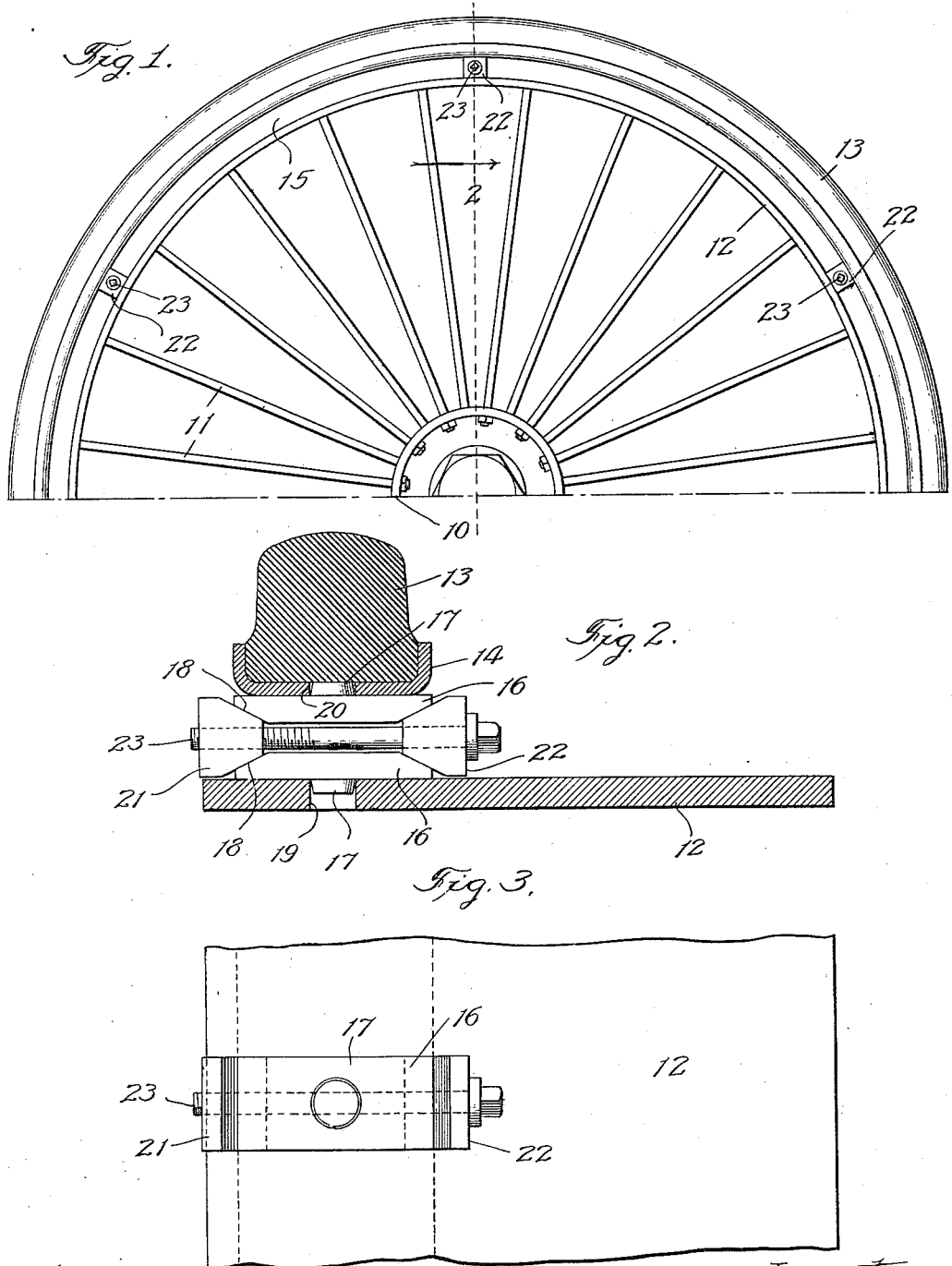

HARRY C. WAITE, OF CHICAGO, ILLINOIS, ASSIGNOR TO ELGIN TRACTOR CORPORATION, OF ELGIN, ILLINOIS, A CORPORATION OF NEW YORK.

REMOVABLE RIM FOR TRACTOR-WHEELS.

1,235,401.   Specification of Letters Patent.   Patented July 31, 1917.

Application filed August 26, 1915. Serial No. 47,500.

*To all whom it may concern:*

Be it known that I, HARRY C. WAITE, a citizen of the United States, residing at West Pullman, Chicago, in the county of Cook and State of Illinois, have invented a new and useful Improvement in Removable Rims for Tractor-Wheels, of which the following is a specification.

My invention relates to improvements in wheel construction and more particularly to a means for removably securing a tire, such as a cushion tire, upon a wheel. My specific problem has been the provision of such a means which would be adapted to use on wheels of agricultural or road tractors and the like relatively heavy vehicles. Such vehicles are ordinarily provided with broad faced steel tires on their wheels and it is found necessary where the vehicles are driven over improved roads to provide cushion or other forms of tires in order to protect the road surface. Such cushion tires are also found necessary for the protection of the machine itself if it is desired to operate the latter at any great speed.

With these considerations in mind, I have provided the tire attaching means, one embodiment of which is illustrated by the accompanying drawings.

In the drawing, Figure 1 is a side elevation of the upper half of a wheel such as a tractor wheel, Fig. 2 is an enlarged section of the wheel on the line 2 of Fig. 1; and Fig. 3 is an enlarged plan view of the top portion of the wheel tread showing the tire securing wedges.

Referring more particularly to the drawing, the numeral 10 designates the hub of the wheel to which are secured spokes 11 carrying a relatively broad flat tread portion 12. Although I have shown this tread portion as having a plain surface it will be understood that it may be corrugated or of any other form commonly used on the tread surfaces of tractor wheels. The cushion tire 13 which is to be mounted upon the wheel tread 12 is carried on a rim 14 of the usual channel shape and of an internal diameter substantially greater than the external diameter of the wheel tread 12, thus providing a clearance shown at 15 in Fig. 1 which is sufficient for the insertion of the tire securing means and is also designed to be great enough to accommodate chains, lugs, corrugations or other ground-gripping or anti-skid devices which may be formed on or detachably secured to the wheel tread 12. The tire securing means preferably comprises a pair of expansion blocks 16 having lugs 17 cast on one face and having their ends tapered or beveled as shown at 18. The blocks 16 are of such thickness that they may be entered between the rim 14 and the tread 12 to permit the lugs 17 to be engaged with apertures 19 and 20 formed in the tread and in the rim 14, respectively. The expansion blocks 18 are engaged at their ends by wedge members 21, 22 which are perforated longitudinally to receive a bolt 23, the head of which bears against the outer face of the block 22 and the threaded end of which engages threads in the bore of the block 21.

In mounting a tire upon a wheel, in accordance with my invention, the wheel would be raised free of the ground and the tire then inserted thereover in such a position as to bring the apertures 20 of the tire rim opposite the apertures 19 in the tread of the wheel. The expansion blocks 16 may then be inserted between the rim and the wheel tread in pairs, as shown in Fig. 2 of the drawing, and after the lugs 17 have been engaged with the apertures the blocks may be separated sufficiently to permit the bolt 23 to be passed between them. Upon screwing up this bolt the wedge blocks 21, 22 are then drawn inwardly against the beveled faces 18 of the expansion blocks, forcing the latter outward and into tight contact with the inner face of the rim and the outer face of the tread. Any preferred number of these expansion devices may be used, depending upon the load upon the wheel and upon the stiffness of the rim 14. In the embodiment of the invention shown six sets of expansion members are used, this having been found to be sufficient for an ordinary light tractor.

While I have particularly shown and described one particular embodiment of my invention, and have set forth the advantages thereof particularly with reference to the use of the invention on tractors, it is to be understood that such showing and description is illustrative only and for the purpose of making my invention more clear and I do not regard the invention as limited to these details or to this specific use except in so far as I have included such limitations within the terms of the following claims in which it is my intention to claim all novelty inherent in my invention as broadly as is possible in view of the prior art.

What I claim as new, and desire to secure by Letters Patent, is—

The combination with a wheel of a rim adapted to be fitted thereover and having an internal diameter substantially greater than the external diameter of the wheel, a plurality of pairs of expansion blocks adapted to be inserted between the opposed faces of the wheel and the rim, lugs carried by the outer faces of said expansion blocks for engagement with recesses in the said wheel and rim, wedge members for expanding the said blocks, and means for forcibly moving said wedge members and for locking the parts in the expanded position.

HARRY C. WAITE.

Witnesses:
 A. C. FISCHER,
 L. V. HIGGINS.